US010460420B2

(12) United States Patent
Sample et al.

(10) Patent No.: US 10,460,420 B2
(45) Date of Patent: Oct. 29, 2019

(54) CONVERTING SPATIAL FEATURES TO MAP PROJECTION

(71) Applicant: The Government of the United States of America, as represented by the Secretary of the Navy, Arlington, VA (US)

(72) Inventors: John T. Sample, Pearl River, LA (US); Elias Z. K. Ioup, New Orleans, LA (US); Bruce Y. Lin, New Orleans, LA (US); Norman Schoenhardt, New Orleans, LA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 20 days.

(21) Appl. No.: 15/821,389

(22) Filed: Nov. 22, 2017

(65) Prior Publication Data

US 2019/0156455 A1 May 23, 2019

(51) Int. Cl.
*G06T 3/00* (2006.01)
*G06T 5/00* (2006.01)

(52) U.S. Cl.
CPC ............ *G06T 3/0043* (2013.01); *G06T 5/006* (2013.01)

(58) Field of Classification Search
CPC .............................. G06T 3/0043; G06T 5/006
USPC .................................................. 701/220, 214
See application file for complete search history.

(56) References Cited

U.S. PATENT DOCUMENTS

| 5,774,826 | A | * | 6/1998 | McBride | G01S 19/42 342/357.29 |
| 5,894,674 | A | * | 4/1999 | Feldman | G01C 1/00 33/1 CC |
| 5,902,113 | A | * | 5/1999 | Pryor | G09B 29/10 283/34 |
| 6,211,814 | B1 | * | 4/2001 | Benjamin | G01S 7/298 342/185 |

(Continued)

OTHER PUBLICATIONS

Snyder, J.P., "Map Projections—A Working Manual", U.S. Geological Survey Professional Paper 1395, United States Government Printing Office, Washington, 1987.

(Continued)

*Primary Examiner* — Santiago Garcia
(74) *Attorney, Agent, or Firm* — US Naval Research Laboratory; William P. Ladd (57) ABSTRACT

Embodiments relate to converting spatial features to a map projection. Initially, a map request that specifies the map projection for a geographic area is obtained. A spatial feature is identified for projecting into the map projection. Until a bisect threshold is satisfied for each line segment in the spatial feature, a bisect is determined for each of the line segments; each line segment is projected into the map projection; and if the bisect threshold is not satisfied for a line segment, the line segment is divided into subsegments, where the bisect threshold specifies an error distance for the line segment after projection. The modified spatial feature is projected into the map projection to obtain a projected spatial feature, and a polar coordinate system that corresponds to the map projection is used to render the projected spatial feature in a spatial map.

20 Claims, 6 Drawing Sheets

(56) References Cited

U.S. PATENT DOCUMENTS

| | | | | |
|---|---|---|---|---|
| 7,791,616 | B2* | 9/2010 | Ioup | G06T 3/00 345/581 |
| 8,274,506 | B1* | 9/2012 | Rees | G06T 17/05 345/419 |
| 2003/0216865 | A1* | 11/2003 | Riewe | G01C 21/165 701/470 |
| 2005/0075119 | A1* | 4/2005 | Sheha | G01C 21/26 455/456.6 |
| 2005/0285876 | A1* | 12/2005 | Balaga | G06T 3/0062 345/629 |
| 2008/0162038 | A1* | 7/2008 | Comer | G01C 21/30 345/620 |
| 2010/0017123 | A1* | 1/2010 | Dropps | G01C 21/00 701/455 |
| 2011/0007953 | A1* | 1/2011 | Bernhardt | G06T 11/206 382/128 |
| 2011/0151415 | A1* | 6/2011 | Darling | G04G 9/0076 434/149 |
| 2015/0319421 | A1* | 11/2015 | Chung | G06T 7/0075 348/46 |
| 2016/0098598 | A1* | 4/2016 | Pahwa | G01C 21/32 382/113 |
| 2017/0103509 | A1* | 4/2017 | Scharfenberger | H04N 9/3185 |
| 2017/0236284 | A1* | 8/2017 | Elliethy | G06T 7/33 382/294 |
| 2018/0003507 | A1* | 1/2018 | Arslan | G01C 21/165 |
| 2018/0195973 | A1* | 7/2018 | Yonekawa | E01C 23/01 |
| 2018/0281795 | A1* | 10/2018 | Ravichandran | B60W 30/181 |
| 2018/0330166 | A1* | 11/2018 | Redden | G06K 9/00657 |
| 2019/0012627 | A1* | 1/2019 | Martin | G06Q 10/06315 |

OTHER PUBLICATIONS

Jain, S., Barclay, T., "Adding the EPSG:4328 Geographic Longitude-Latitude Projection to Terra Server", Technical Report MSR-TR-2003-56, Microsoft Research, Redmond, WA, 2003, pp. 1-12.

Mesick, H.C., Ioup, E.Z.K., and Sample, J.T., "A Faster Technique for the Transformation of Universal Transverse Mercator Projected Raster Images into a Geodetic Projection", Naval Research Laboratory, NRL/MR/7440-05-8867, Mar. 11, 2005.

* cited by examiner

CONVERTING SPATIAL FEATURES TO MAP PROJECTION

BACKGROUND

A geographic information system (GIS) is a system for capturing, storing, analyzing, and managing data and associated attributes, which are spatially referenced to the earth. More generically, a GIS is a tool (e.g., a computer system) that allows users to interact with geographically-referenced information. Spatially referenced features (e.g., countries, rivers, lakes, cities, etc.) can be rendered by a GIS to provide a user with an interactive map.

Coordinate systems are used as references for the locations of spatial features that are represented in a GIS. For any given location on the Earth and for a given map display and scale, one or many of the more than 300 geographic coordinate systems and more than 2,500 projected coordinate systems can be applied. A geographic coordinate system specifies a location on the Earth using three coordinates of a spherical coordinate system aligned with the sign axis of the Earth.

A projection is a two-dimensional representation of a three-dimensional area, and a projection may be implemented using any of the projected coordinate systems. The projected coordinate system defines one or more mathematical functions to translate the three-dimensional representation to a two-dimensional representation. For example, a projection may be used to represent the Earth, a three-dimensional object, as a planar surface such as a rendered map in a GIS.

Properties of the Earth's surface can be measured independent of their geography. Examples of properties include area, shape, direction, distance, and scale. Map projections can be configured to preserve one or more of these properties, though not all of them simultaneously. Each projected coordinate system and the resulting map projection, preserves, compromises, or approximates the basic properties in different ways. The purpose of the map, then, determines which projected coordinate system should be utilized to generate the map projection.

Figure 1:
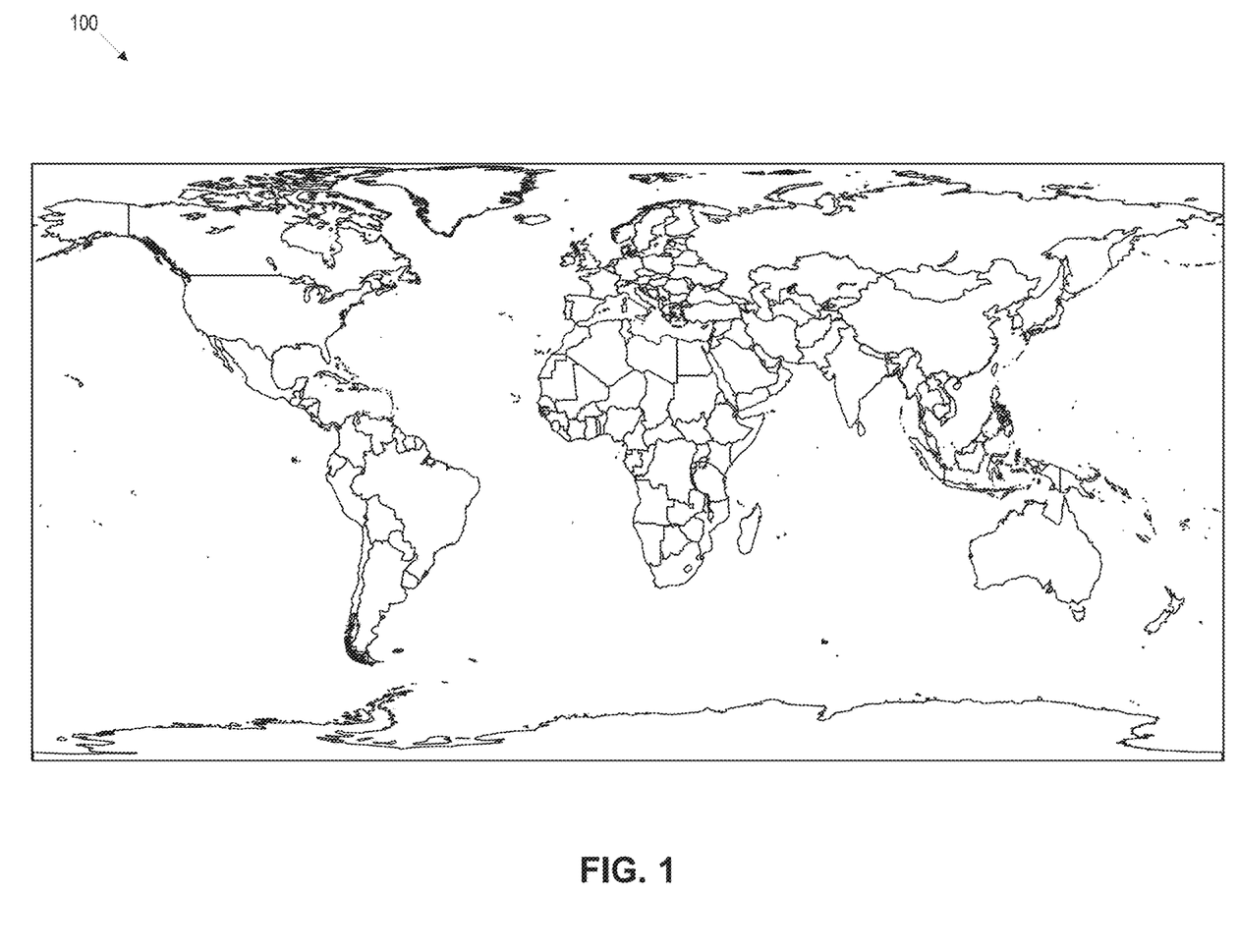
FIG. 1 shows a typical map projection 100 in the prior art.
Figure 2:
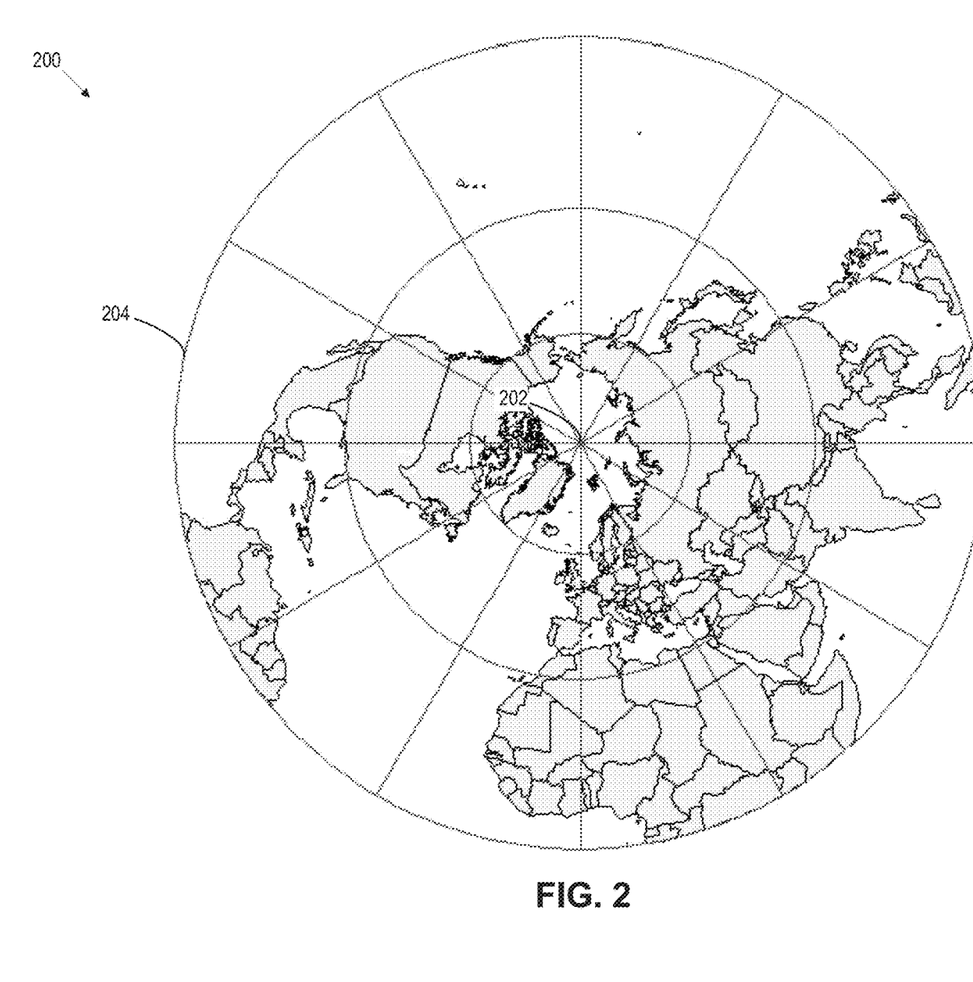
FIG. 2 shows a map projection 200 in the prior art.

FIG. 1 shows a typical map projection 100. FIG. 2 shows an example of a map projection, a polar projection 200. Polar projections 200 are highly distorted and stretched for areas away from the pole. This distortion presents a problem for reprojection of spatial features. A typical geographic reprojection projects each of the geographic points of the spatial feature to the target projection. Simple projecting the geographic points works well for most projections, even those with significant distortion; however, for polar projections this technique will create highly distorted spatial features. In FIG. 2, the area in the center of the image is the North Pole 202. Outward from the center 202 are areas of lower latitude, and a result of the polar projection is that areas of lower latitude are stretched relative to areas around the center 202. Area stretching can be up to a factor of two for areas near the equator 204.

SUMMARY

Embodiments relate to converting spatial features to a map projection. Initially, a map request that specifies the map projection for a geographic area is obtained. A spatial feature is identified for projecting into the map projection. Until a bisect threshold is satisfied for each line segment in the spatial feature, a bisect is determined for each of the line segments; each line segment is projected into the map projection; and if the bisect threshold is not satisfied for a line segment, the line segment is divided into subsegments, where the bisect threshold specifies an error distance for the line segment after projection. The modified spatial feature is projected into the map projection to obtain a projected spatial feature, and a polar coordinate system that corresponds to the map projection is used to render the projected spatial feature in a spatial map.

DESCRIPTION

As discussed above, typical map projections such as polar projections can be highly distorted, which can cause spatial features to become stretched and distorted beyond usability. Embodiments of the invention address this difficulty by providing a framework that allows spatial features that are in a common projection to be properly reprojected into map projections that cause distortion.

Embodiments of the invention project spatial features into a map projection without distortion by iteratively processing line segments in a spatial feature to ensure each segment satisfies a bisect threshold. Spatial features can include lines, polylines, polygons, etc. and are typically stored as spatial data such as an ordered list of geographic points. Each spatial feature is stored in a corresponding geographic coordinate. By dividing segments of a spatial feature into subsegments according to an error distance, the distortion in the projected spatial feature is reduced.

Figure 3:
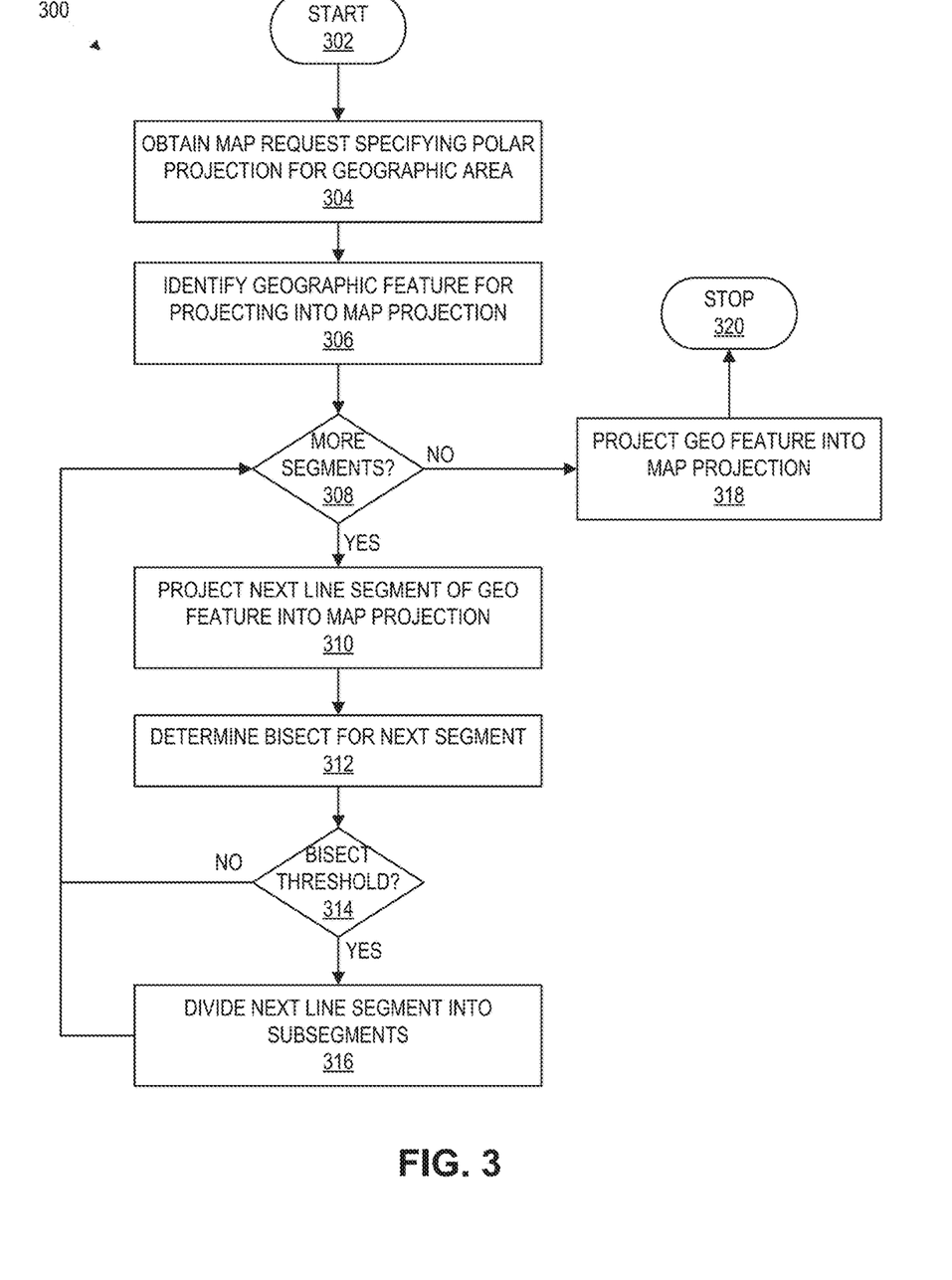
FIG. 3 is an example workflow for converting spatial features to a map projection.

FIG. 3 is an example workflow 300 for converting spatial features to a map projection. As is the case with the other processes described herein, various embodiments may not include all of the steps described below, may include additional steps, and may sequence the steps differently. Accordingly, the specific arrangement of steps shown in FIG. 3 should not be construed as limiting the scope of converting spatial features to a map projection.

In block 302, the workflow 300 starts and proceeds to block 304, where a map request is obtained that specifies a map projection (e.g., polar projection) for a geographic area. For example, the map request can request a map that (1) has a specified bounds (i.e., geographic area), (2) includes specified imagery and spatial features, and (3) is in a selected polar projection. In block 306, a spatial feature for projecting into the map projection can be identified. For example, each of the spatial features specified in the map request can be iteratively processed as described below.

In block 308, a determination is made as to whether there are more line segments to process. If there are more line segments to process, the bisected line segment is projected to the target map projection in block 310. In block 312, a bisect is determined for the next line segment of the spatial feature. As described above, the spatial feature may be stored in a spatial database in a geographic coordinate system, so the bisect of the line segment can determined both (1) for the original line segment with respect to the geographic coordinate system and (2) for the projected line segment with respect to the projected coordinate system.

In block 314, a determination is made as to whether a bisect threshold is exceeded. The bisect threshold specifies an error distance that the projected location of the bisect should be within the actual location of the bisect. If the bisect threshold is not exceeded, the workflow 300 can return to block 308 to process the next segment. If the bisect threshold is exceeded, the line segment is divided into subsegments in block 316. For example, the bisect point can be added to the original line segment to create two line subsegments. In another example, the line segment can be divided into subsegments of a predetermined distance.

Workflow 300 then returns to block 308 to process the subsegments before processing the other original segments of the spatial feature (i.e., the subsegments are recursively processed). After all the segments and subsegments are processed, workflow 300 proceeds to block 318, where the modified spatial feature is projected into the target map projection. Workflow 300 can then proceed to block 318 and stop.

Figure 4:
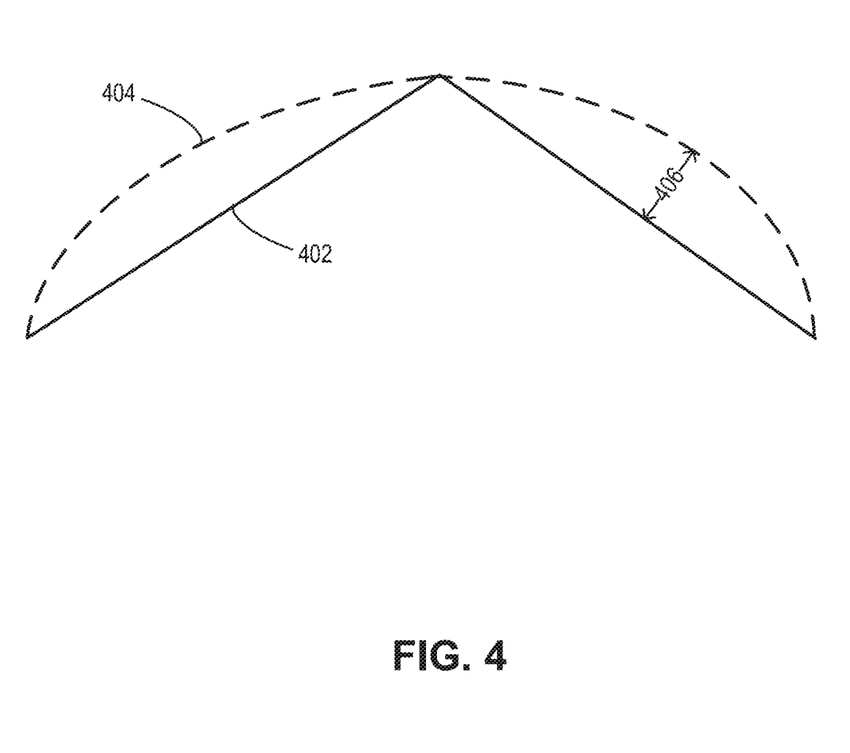
FIG. 4 shows a spatial feature that is projected into a map projection.

FIG. 4 shows a spatial feature 402 that is projected into a map projection. The projected feature 404 deviates from the original spatial feature 402 because of distortion introduced by the map projection. The spatial feature 402 has three vertices, which results in two line segments. The second line segment is examined at its bisect to determine the error distance 406. The error distance 406 can be used to determine whether the projected feature 404 exceeds the bisect threshold as described above.

Figure 5:
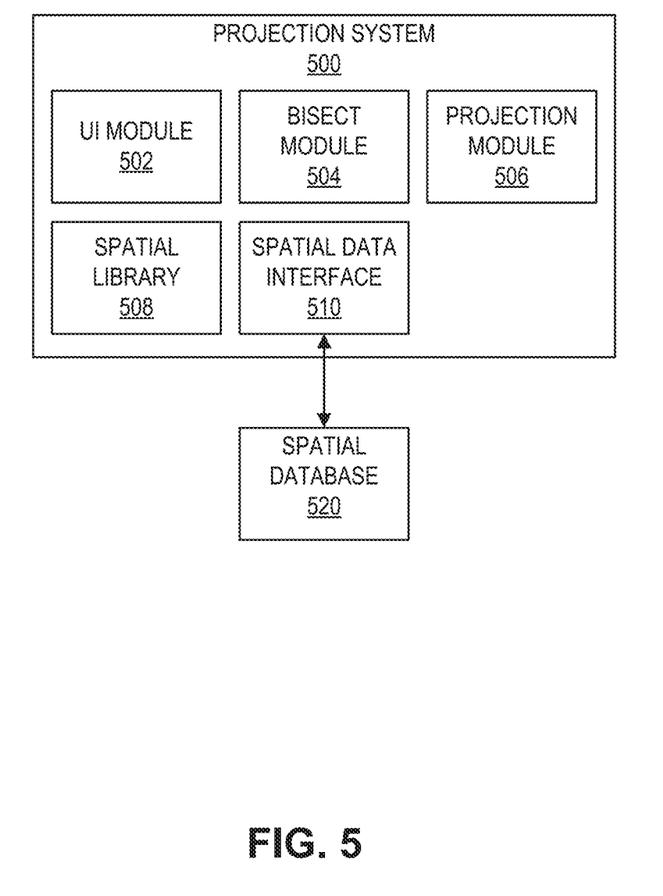
FIG. 5 is a diagram of an example system for converting spatial features to a map projection.

FIG. 5 is a diagram of an example system for converting spatial features to a map projection. The system of this example includes a projection system 500, and a spatial database 520.

Projection system 500 is configured to convert features to a map projection in response to map requests. While FIG. 5 shows two databases, projection system 500 could be connected to any number of databases to convert features to a map projection. Projection system 500 includes a UI module 502, a bisect module 504, a projection module 506, a spatial library 508, and a spatial data interface 510.

UI module 502 provides a user interface that allows users to interact with projection system 500. For example, UI module 502 can provide a web-based map interface that allows users to generate and use GIS maps that include spatial features. In this example, the UI module 502 can allow a user to submit a map request for geospatial data to be rendered on a GIS map, where the map interface receives a specified bounds (i.e., geographic area), specified imagery and spatial features, and a selected projection, etc. as parameters from the user.

Bisect module 504 manages bisect thresholds for projecting spatial features. Bisect module 504 can allow a user via the UI module 502 to specify error distances, predetermined distances for subsegments, error distance and scale relationships, etc. Bisect module 504 can receive a spatial feature and map projection as input and provide a divided feature as output, where each segment of the divided feature satisfies the bisect threshold.

Projection module 506 projects imagery and spatial features into specified projections. For example, the projection module 506 can receive spatial features and a selected projection as input and provide projected features in the selected projection as output. Polar projections that are centered on either the North or South Pole are used throughout the examples described herein; however, other map projections that introduce distortion (e.g., Cassini projection, Mercator projection, stereographic projection, etc.) could be used.

Spatial library 508 is configured to perform spatial operations on imagery and spatial features. For example, spatial library 508 can be used by bisect module 506 to divide spatial features. In another example, spatial library 508 can be used by bisect module 504 to determine whether a bisect threshold is satisfied.

Spatial data interface 510 allows projection system 500 to access spatial database 520. For example, spatial data interface 510 can be database drivers that provide access to a database backend that includes spatial database 520. Different spatial interfaces 510 can be implemented to support different types of spatial features (e.g., vector features, points of interest, etc.) and imagery (e.g., satellite images, topographical maps, etc.). In this manner, the implementation of projection system 500 is independent of the type of spatial data/imagery.

Spatial database 520 can include any number of spatial data layers. In some cases, spatial database 520 can include metadata for spatial data that is stored at remote locations. Each spatial data layer may be in a source coordinate system, which can be used to perform projections of the corresponding spatial data.

Figure 6:
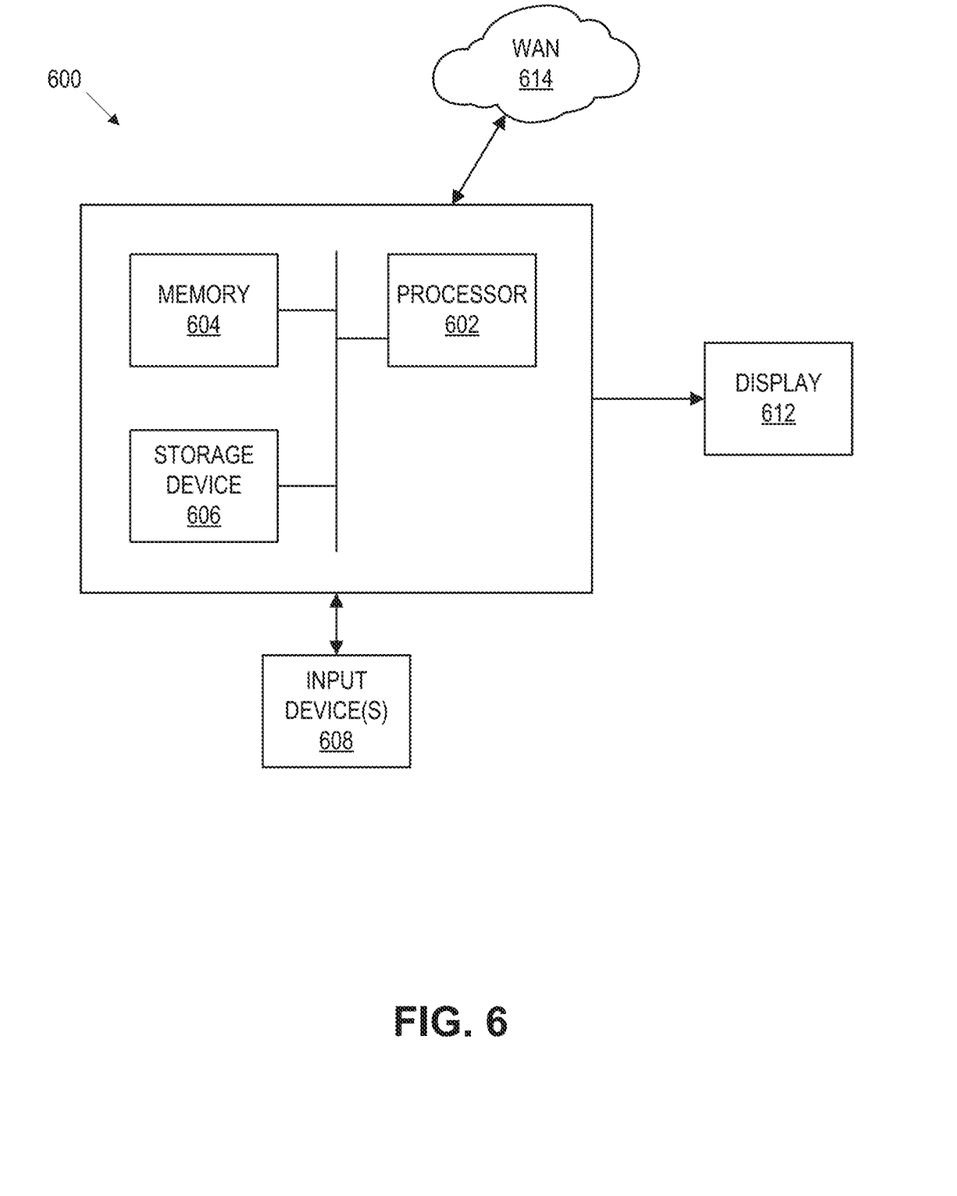
FIG. 6 is a diagram of an example computer system for converting spatial features to a map projection.

The invention may be implemented on virtually any type of computer regardless of the platform being used. For example, as shown in FIG. 6, a computer system 600 includes a processor 602, associated memory 604, a storage device 606, and numerous other elements and functionalities typical of today's computers (not shown). The computer 600 may also include input means 608, such as a keyboard and a mouse, and output means 612, such as a monitor. The computer system 600 may be connected to a local area network (LAN) or a wide area network (e.g., the Internet) 614 via a network interface connection (not shown). Those skilled in the art will appreciate that these input and output means may take other forms.

Further, those skilled in the art will appreciate that one or more elements of the aforementioned computer system 600 may be located at a remote location and connected to the other elements over a network. Further, the invention may be implemented on a distributed system having a plurality of nodes, where each portion of the invention (e.g., projection module, spatial library, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for converting spatial features to a map projection, comprising:
obtaining a map request that specifies the map projection for a geographic area, wherein the map projection is a two dimensional representation of a three dimensional region in the geographic area, and wherein the map projection corresponds to a polar coordinate system;

identifying a spatial feature for projecting into the map projection;

until a bisect threshold is satisfied for each of a plurality of line segments in the spatial feature:
  determining a bisect for each of the plurality of line segments;
  projecting each of the plurality of line segments into the map projection; and
  if the bisect threshold is not satisfied for a line segment of the plurality of line segments, dividing the line segment into a plurality of subsegments, wherein the bisect threshold specifies an error distance for the line segment after projection;

projecting the modified spatial feature into the map projection to obtain a projected spatial feature; and using the polar coordinate system to render the projected spatial feature in a spatial map.

2. The method of claim 1, wherein the line segment is divided at the bisect of the line segment.

3. The method of claim 1, wherein the error distance is determined based on a map scale of the spatial map.

4. The method of claim 1, wherein each of the plurality of subsegments is a predefined distance.

5. The method of claim 1, wherein the map projection is a polar projection.

6. A system comprising:
  a spatial database to store a spatial feature and a projected coordinate system; and
  a computer processor to execute:
    a bisect module to:
      identify a spatial feature for projecting into a map projection, wherein the map projection is a two dimensional representation of a three dimensional region in a geographic area;
      until a bisect threshold is satisfied for each of a plurality of line segments in the spatial feature:
        determine a bisect for each of the plurality of line segments;
        project each of the plurality of line segments into the map projection; and
        if the bisect threshold is not satisfied for a line segment of the plurality of line segments, divide the line segment into a plurality of subsegments, wherein the bisect threshold specifies an error distance for the line segment after projection;
    a projection module to project the modified spatial feature into the map projection to obtain a projected spatial feature; and
    a user interface module to:
      obtain a map request that specifies the map projection for a geographic area; and
      use the projected coordinate system that corresponds to the map projection to render the projected spatial feature in a spatial map.

7. The system of claim 6, wherein the line segment is divided at the bisect of the line segment.

8. The system of claim 6, wherein the error distance is determined based on a map scale of the spatial map.

9. The system of claim 6, wherein each of the plurality of subsegments is a predefined distance.

10. The system of claim 6, wherein the map projection is a polar projection.

11. A non-transitory computer-readable medium comprising executable instructions for converting spatial features to a map projection, the instructions when executed causing a computer processor to:
  obtain a map request that specifies the map projection for a geographic area, wherein the map projection is a two dimensional representation of a three dimensional region in the geographic area;
  identify a spatial feature for projecting into the map projection;
  until a bisect threshold is satisfied for each of a plurality of line segments in the spatial feature:
    determine a bisect for each of the plurality of line segments;
    project each of the plurality of line segments into the map projection; and
    if the bisect threshold is not satisfied for a line segment of the plurality of line segments, divide the line segment into a plurality of subsegments, wherein the bisect threshold specifies an error distance for the line segment after projection;
  project the modified spatial feature into the map projection to obtain a projected spatial feature; and
  use a polar coordinate system that corresponds to the map projection to render the projected spatial feature in a spatial map.

12. The non-transitory computer-readable medium of claim 11, wherein the line segment is divided at the bisect of the line segment.

13. The non-transitory computer-readable medium of claim 11, wherein the error distance is determined based on a map scale of the spatial map.

14. The non-transitory computer-readable medium of claim 11, wherein each of the plurality of subsegments is a predefined distance.

15. The non-transitory computer-readable medium of claim 11, wherein the map projection is a polar projection.

16. The method of claim 1, further comprising:
  projecting a plurality of modified spatial features, corresponding to a respective plurality of spatial features, into the map projection to obtain a respective plurality of projected spatial features.

17. The method of claim 16, wherein each spatial feature in the plurality of spatial features is stored at a respective geographic coordinate in a plurality of geographic coordinates.

18. The method of claim 17, wherein the map request identifies the geographic area and the plurality of spatial features.

19. The method of claim 18, wherein the map request identifies a selected polar projection for rendering the plurality of projected spatial features in the spatial map.

20. The method of claim 1, wherein determining the bisect for each of the plurality of line segments further comprises determining a projected bisect, corresponding to a projected coordinate system, for each of the plurality of line segments.

* * * * *